United States Patent [19]

Surguy

[11] Patent Number: 5,233,338
[45] Date of Patent: Aug. 3, 1993

[54] DISPLAY DEVICES HAVING COLOR SEQUENTIAL ILLUMINATION

[75] Inventor: Paul W. H. Surguy, Hayes, England

[73] Assignee: Thorn EMI plc, London, England

[21] Appl. No.: 765,528

[22] Filed: Sep. 25, 1991

[30] Foreign Application Priority Data

Sep. 25, 1990 [GB] United Kingdom ............... 9020892

[51] Int. Cl.5 ............................................. G09G 3/36
[52] U.S. Cl. ................................. 340/784; 340/701; 358/241
[58] Field of Search ............. 340/784, 805, 811, 701, 340/702; 359/54, 55; 358/60, 236, 241

[56] References Cited

U.S. PATENT DOCUMENTS

| | | | |
|---|---|---|---|
| 4,739,320 | 4/1988 | Dolinar et al. | 340/805 |
| 4,742,347 | 3/1988 | Arismendi | 340/802 |
| 5,122,870 | 6/1992 | Takeda et al. | 358/60 |

FOREIGN PATENT DOCUMENTS

| | | |
|---|---|---|
| 0261896 | 3/1988 | European Pat. Off. . |
| 0301715 | 2/1989 | European Pat. Off. . |
| 0319293 | 6/1989 | European Pat. Off. . |
| 3-125187 | 5/1991 | Japan ................... 340/793 |
| 3-136491 | 6/1991 | Japan . |
| WO9110224 | 7/1991 | PCT Int'l Appl. . |
| 2172733A | 9/1986 | United Kingdom . |

Primary Examiner—Alvin E. Oberley
Assistant Examiner—Chanh Nguyen
Attorney, Agent, or Firm—Keck, Mahin & Cate

[57] ABSTRACT

A color sequential liquid crystal display, such as a television display, includes a lattice of selectably settable pixel elements which are time multiplexed addressed and illuminated during addressing to produce sequential red green and blue light outputs in any display period. The addressing of pixel elements in successive frame periods is arranged to occur in opposing directions so as to compensate spatial intensity variation which would otherwise arise from illumination of the pixel elements during the addressing.

18 Claims, 4 Drawing Sheets

DISPLAY DEVICES HAVING COLOR SEQUENTIAL ILLUMINATION

BACKGROUND OF THE INVENTION

The present invention relates to display devices and in particular, but not exclusively, to display devices incorporating liquid crystal display elements.

Colour sequential liquid crystal displays are known, such as those described in, for example, GB 2 172 733A, EP 0301715 and EP 0261896. In these arrangements, a complete field of one of the primary colours for display is written into the liquid crystal display (LCD) while the light sources for backlighting the display are switched off, i.e. the display is in darkness. The light source of the appropriate colour is then energised for a short period so as to display the colour concerned through those pixel elements of the LCD which have been set to their light transmissive state whilst the display is in its dark state. At the end of this short period of light source energisation a field of a second of the primary colours is written into the display whilst the display is held in its dark state, i.e. the light sources for backlighting the display are switched off. The lamp of the second primary colour is then energised for a short period to display the appropriate colour. The process is then repeated for the third primary colour and the eye of a viewer of the LCD integrates the three sequentially displayed colours, which is thereby perceived as a field of colour picture information.

Hence it can be seen that to provide a colour picture, the picture information for the whole display must be written three times per frame period, generally of 20 milliseconds duration, and arranging that, in time gaps between the writing operations, the appropriately coloured lamp is energised.

Typically, the three primary colours are used to build the colour picture for display and, hence, each frame period is divided into three time segments each of which is dedicated to a respective primary colour, and the time available for writing and illuminating respectively in each time segment is allocated, typically, in the ratio 3:1. Thus, in sequence, the first quarter of a frame period is dedicated to writing information of one colour, usually 'red', into the display and the following twelfth of the frame period is used to illuminate the display with light of that colour (red). The following quarters and twelfths of the frame period are used, respectively, to write and display the other two primary colours, usually in the order of 'green' and then 'blue'.

The constraint of illuminating the lamp of each colour for only one twelfth of each frame period severely limits the brightness of the display. Furthermore, in view of restraints on power dissipation and typical lamp response times, the situation cannot be readily improved by increasing lamp wattage, thereby merely causing the lamps to provide more light during their very brief periods of illumination.

SUMMARY OF THE INVENTION

The present invention seeks to provide an improved method of operating such displays which enables the lamp illumination time to be increased substantially, considerably increasing the brightness of the display.

Accordingly, there is provided a method of operating a display device having a lattice of selectably settable pixel elements, the method comprising time multiplex addressing pixel elements of the display during each of a plurality of time intervals within a display period and, contemporaneously therewith illuminating the lattice to produce within a display period a plurality of light outputs each having a respective colour characteristic and a respective time interval within the display period, the time multiplexed addressing of pixel elements arranged to produce a light output of at least one respective colour characteristic during any display period, which output is arranged in a first sequence direction, and the time multiplexed addressing is arranged to produce a light output of the said at least one respective colour characteristic during a display period following the said any display period and being arranged in a second sequence direction opposite to the first sequence direction.

In this manner the lamps can remain energised throughout the respective period for writing information into the display, enabling each lamp to be energised for up to substantially one third of each display period, permitting a four fold increase in the light output from the display without causing the display to appear to dim in the direction of scanning.

In an alternative embodiment of the invention the time multiplexed addressings of the pixels to produce each of the plurality of light outputs of respective colour characteristics within a display period are arranged in the first sequence direction and the time multiplexed addressings of the pixels to produce each of the plurality of light outputs of respective colour characteristics are arranged in the second sequence direction during a display period following the said display period.

Advantageously, the display period following the said display period in which the time multiplexed addressing of the pixels occurs in the first sequence direction comprises the immediately succeeding display period.

Preferably, the light outputs of a respective colour characteristic comprise red, green and blue light outputs, and the pixels are time multiplexed in one of the sequence directions to provide the red and blue light outputs and in the opposite sequence direction to provide the green light output.

The lattice may comprise a plurality of rows and columns of pixel elements, the first sequence direction comprising addressing the elements from top towards bottom, and the second sequence direction comprising addressing the elements from bottom towards top.

Alternatively the first sequence direction may comprise addressing the elements in columns from a first side thereof towards the opposite side thereof and the second sequence direction may comprise addressing the elements from the opposite side towards the first side thereof.

Furthermore, the elements may be addressed as rows or columns in a first sequence direction from a central region of the display to one side thereof and in a second sequence direction comprising from one side thereof towards the central region.

In a preferred embodiment the respective time intervals each comprises substantially one third of a display period.

The method of the invention may also provide for blanking the lattice during each time interval of a display period, thereby to provide no light output from the display.

The present invention also provides a display device comprising a lattice of selectably settable pixel elements, addressing means for time multiplex addressing pixel elements during each of a plurality of time intervals within a display period for the display, and illumination means for illuminating the lattice contemporaneously with the time multiplexed addressing thereof, for providing within a display period a plurality of light outputs each having a respective colour characteristic and a respective time interval within the display period, the addressing means being arranged to time multiplex address pixel elements in a first sequence direction in any one display period to produce a light output of at least one respective colour characteristic, and, in a display period following the said display period, to time multiplex address pixel elements in a second sequence direction to produce a light output of the said at least one respective colour characteristic, the second sequence direction being opposite to the first sequence direction.

Advantageously, the addressing means is arranged to address the pixels to produce each of the plurality of light outputs in a display period in the same sequence direction.

The light outputs preferably comprise red, green and blue light outputs and the addressing means is arranged to time multiplex pixels to provide the red and blue light outputs in one of the sequence directions and the green light output in the opposite sequence direction.

BRIEF DESCRIPTION OF THE DRAWINGS

The present invention will now be described, by way of example only, with reference to the accompanying drawings in which.

DETAILED DESCRIPTION

Figure 1:
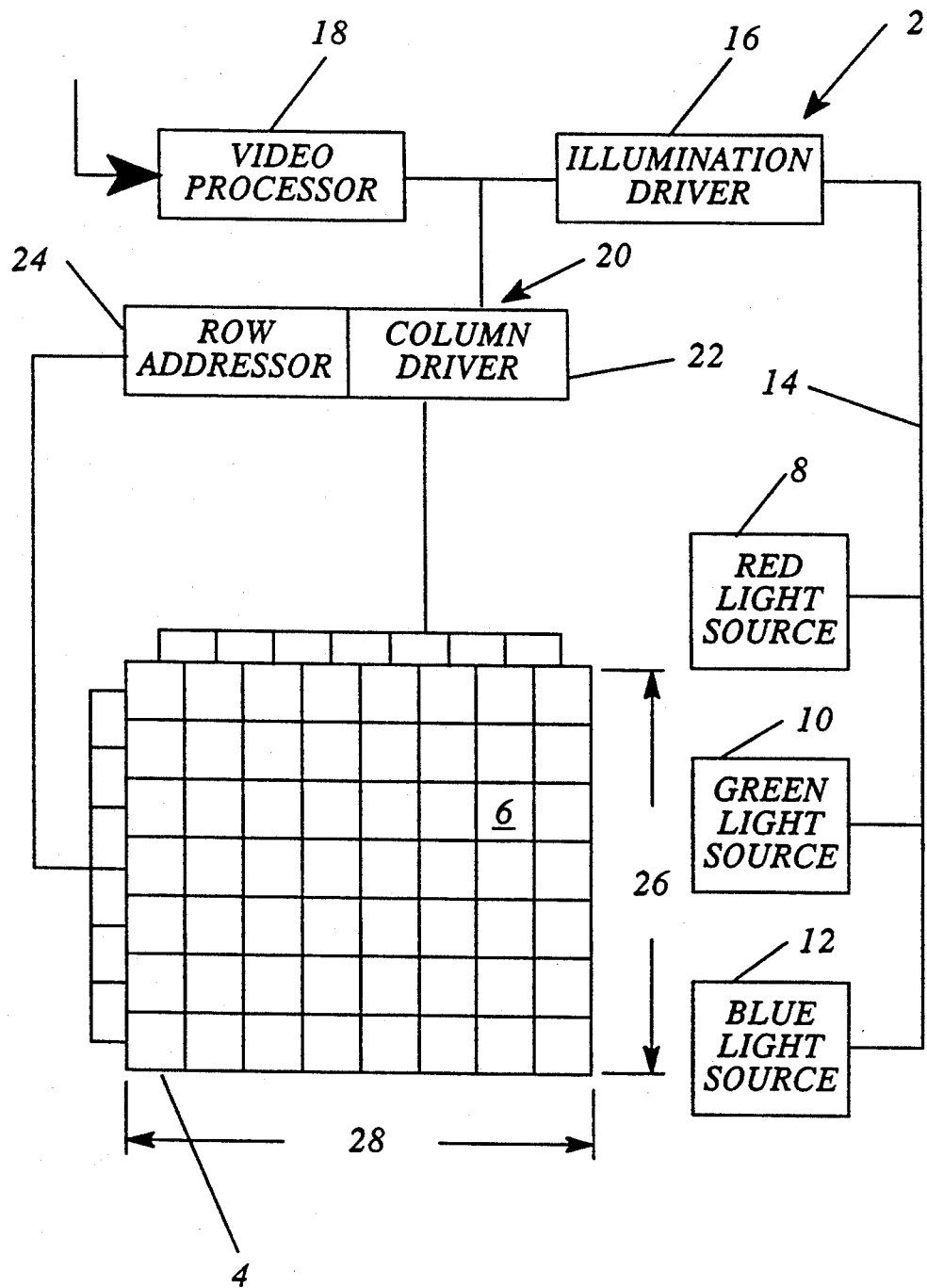
FIG. 1 shows schematically part of a liquid crystal display embodying the present invention.

Referring to FIG. 1, a display shown generally as 2 includes a matrix 4 of selectably settable pixel elements such as liquid crystal elements 6 which, preferably, are ferroelectric liquid crystal elements. The matrix 2 is back lit by red, green and blue light sources, 8, 10 and 12 respectively, which produce beams of light having their respective colour characteristic. Colour sequential illumination of the matrix 4 by the light sources 8, 10, 12 is effected by signals received along a line 14 from an illumination driver circuit 16 under the control of a video processor 18, which receives a video input signal, such as a broadcast signal or a signal from a tape source (not shown).

The elements 6 are controlled by addressing signals provided by an addressing circuit 20 which comprises a column driver circuit 22 and a row addressor circuit 24 which address, respectively, columns and rows of the matrix 4, depicted in FIG. 1 by, respectively, reference numerals 26, 28. The addressing circuit 20 is, like the illumination driver circuit 16, under the control of the video processor 18.

To provide an image for display, the elements 6 of matrix 4 are updated at three times the normal frame period of the video signal received by the video processor 18, i.e. once for each of the primary colours produced by the lamps 8, 10 and 12. Colour sequential illumination of the matrix 4 is provided by illuminating each of the lamps 8, 10 and 12, once in sequence during the frame period. Hence, the image is formed by setting each element 6 for each colour during each frame period so that the appropriate amount of red, green and blue light is transmitted by each element 6, the eye of an observer integrating the sequentially produced red, green and blue light transmissions for each pixel to provide the perceived visual colour image.

Figure 2:
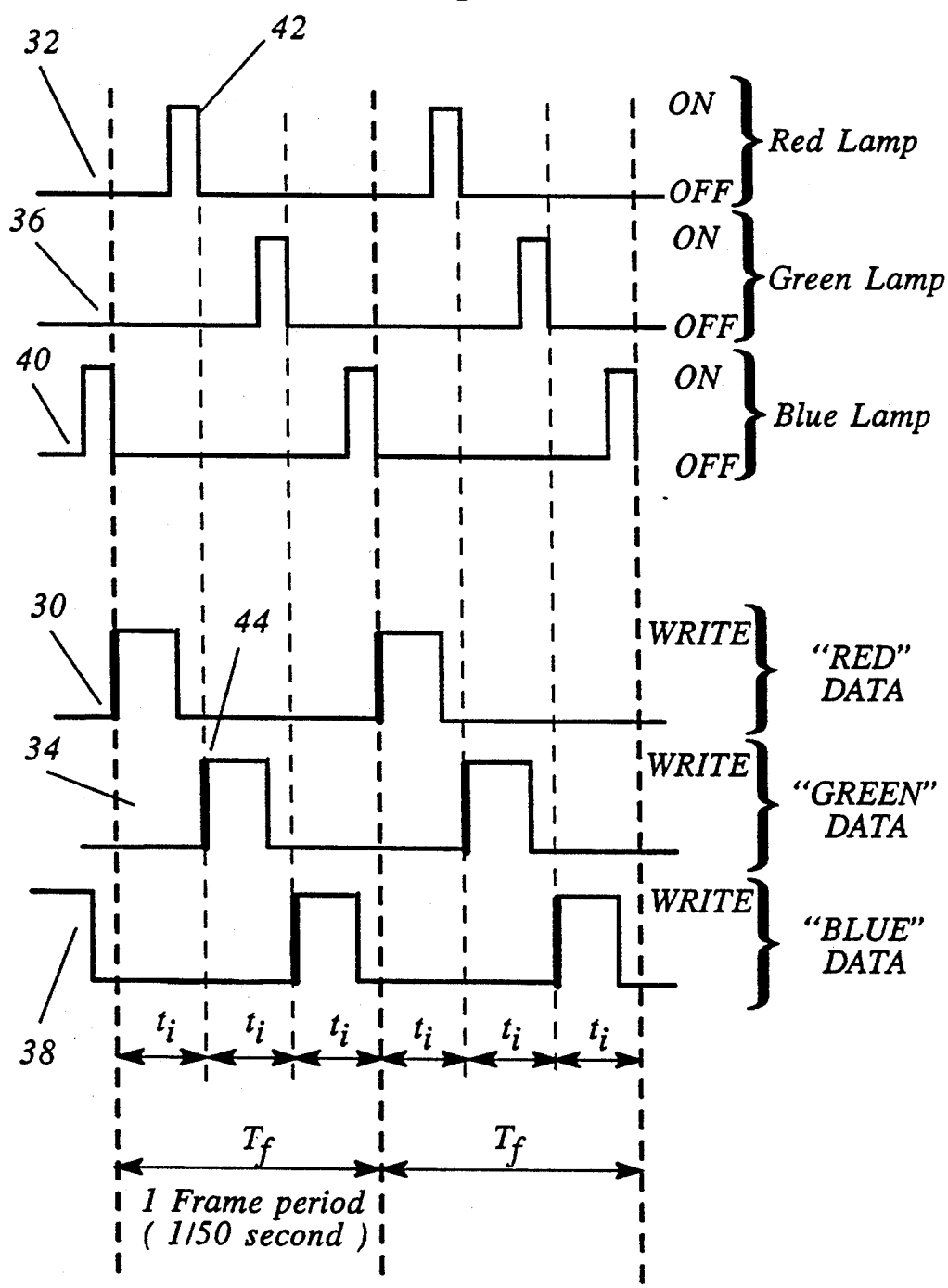
FIG. 2 is a schematic representation of waveforms used in known liquid crystal display devices.
Figure 3:
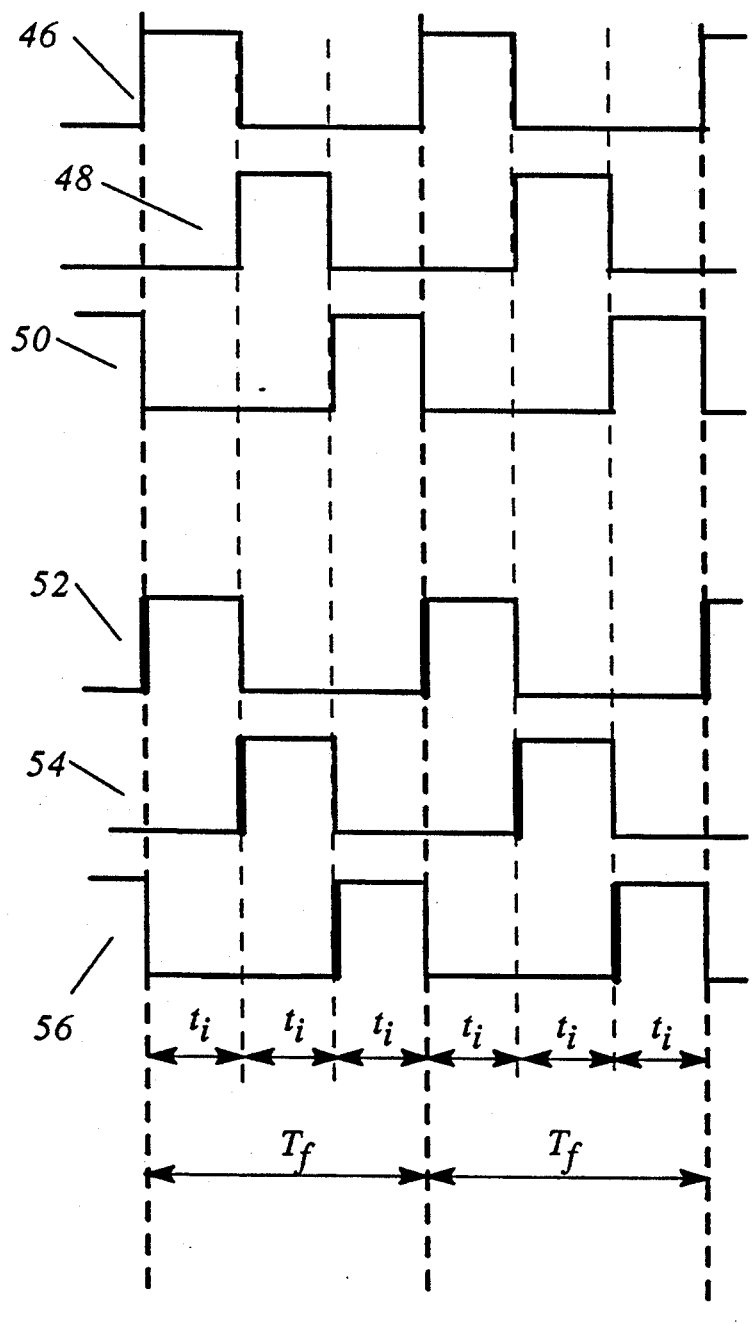
FIG. 3 is a schematic representation of waveforms for use in a display device and in accordance with the present invention.

For a basic television frame rate of 50 Hz, the frame period, depicted as $T_f$ in FIGS. 2 and 3, is 20 milliseconds. All of the elements 6 of the matrix 4, must therefore, have their addressing information written in three times per frame period $T_f$, with the illumination driver arranging that, in each time space between the addressing periods, the appropriate lamp 8, 10 or 12 is energised.

As can be seen from FIG. 2, each frame period $T_f$ is divided into three equal time intervals $t_i$, each of which is dedicated to one of the primary colours, red, green and blue. It will be appreciated that, if no other measures are taken, as will be described below, the addressing of all of the pixels 6 for each colour must be effected before the appropriate lamp is energised. With known forms of addressing, this has been considered necessary otherwise the pixels which are set for transmission of light during the early stages of a time interval would display light for a longer period than those pixels set for light transmission during the latter stages of the same time interval. Hence, assuming that the elements 6 of matrix 4 are addressed from top to bottom for each colour, the resultant image would be noticeably brighter at the top than at the bottom of the display. Thus, as shown in FIG. 2, each frame period $T_f$ is divided into three time intervals, each dedicated to one colour, and the time for addressing and illuminating the elements is, respectively, allocated in the ratio 3:1 in each of the three time intervals.

Hence, as can be seen in sequence from FIG. 2, in the known systems the first quarter of a frame period is dedicated to writing red information into the display, as shown by waveform 30, and the following twelfth of the frame period is used to illuminate the display with red light, as shown by waveform 32. The following time intervals of the display, each constituting a quarter and a twelfth of a frame period, are used to write and display the green and blue picture information as shown, respectively, by waveforms 34, 36 and 38, 40 in FIG. 2.

To ensure that a pixel does not unintentionally transmit the next colour for display during any write or addressing period, the address signals are arranged to provide a black or blanking level setting for the display prior to each writing or addressing period. During the blanking level setting all of the elements 6 of the matrix 4 are set into a light blocking mode. Hence, for example, should the red lamp 8 not extinguish exactly at the fall of pulse 42, the blanking level setting, each of which lasts for only a small fraction 44 of each time interval, ensures that any element 6, which has been transmitting red light and is also to transmit green light, does not continue to transmit red light during the writing of the green data to that pixel.

It will be appreciated from the above description that the the constraint of illuminating each lamp for only one twelfth of each frame period severely limits the brightness of the display. Hence, the present invention proposes an addressing method which enables the lamps 8, 10, 12 to remain on throughout the writing periods associated with the appropriate information. In this manner, the time for writing information to update the matrix 4 for each colour during each frame period $T_f$, as well as the period of illumination of each lamp 8, 10, 12, can be extended to substantially one third of each frame period, as can be seen from FIG. 3. It can be seen from waveforms 46, 48, 50 of FIG. 3 that the red, green and blue lamps are each energised for the duration of a time interval $t_i$ and that the writing of the red, green and blue data occurs substantially simultaneously with lamp energisation except for the blanking level setting between adjacent writing periods, as shown by waveforms 52, 54 and 56 of FIG. 3. The period of the blanking level setting is small in comparison to each of the time intervals $t_i$ and can, for example, be the time taken to write two lines, either rows or columns dependent on how addressing is achieved, of the elements 6.

It will be appreciated that, considering the contemporaneous occurrence of the writing and illumination periods, the first rows or columns of elements 6 that are addressed during any frame period are illuminated for a considerably longer time than are the last rows or columns to be addressed during the same period. Thus, if no countermeasures are taken, and assuming that addressing occurs in rows from top to bottom of the matrix 4, the displayed image would be brightest at the top, fading to dull towards the bottom.

In the present invention the non-uniform brightness of the display is compensated by ensuring that the elements for each colour to be displayed, in successive frame periods, are addressed in opposing directions, the effect so caused being effectively cancelled by the integration of the eye of an observer of the image.

Figure 4:
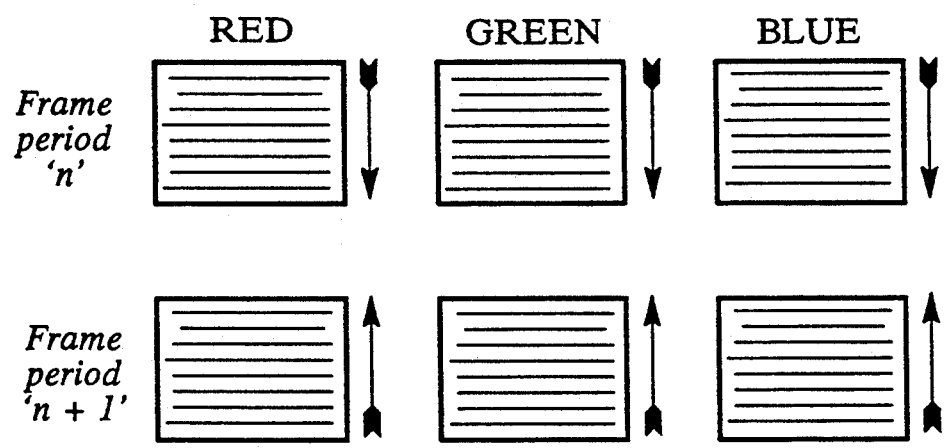
FIGS. 4 and 5 illustrate schematically sequence directions for addressing the pixel elements of the display shown in FIG. 1.
Figure 5:
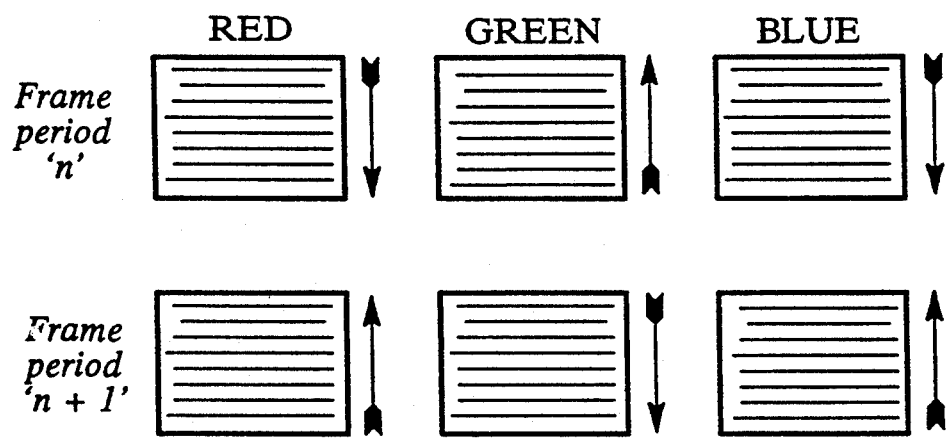

This compensation in screen brightness can be achieved by a variety of forms of addressing of the pixel elements 6, two examples of which are shown in FIGS. 4 and 5. All that is required is to ensure that the non uniformity of brightness of any colour displayed is compensated from one frame to the next. Hence, as can be seen from FIG. 4, the pixel elements 6 can be addressed row by row from top to bottom for all three colours red, green and blue during one frame 'n' and then addressed from bottom to top for all three columns during the next frame 'n+1'. In frame 'n+2' (not shown) the addressing would once again be from top to bottom; and so on.

This method of addressing can be used with interlaced or non-interlaced scanning systems. In the latter type system, the top to bottom addressing could, for example, be effected on even frames, and the bottom to top addressing could be effected on the interleaved odd frames.

Alternatively, the scanning direction could be reversed for any colour between successive frame periods, as shown in FIG. 5. As can be seen from this figure, in frame period 'n' the pixel element addressing to display 'red' and 'blue' colours is effected from top to bottom whilst element addressing to display 'green' is effected from bottom to top; and vice versa for each of the three colours during the next frame period 'n+1'; and so on. This scanning arrangement is particularly advantageous as it helps to maintain an overall intensity balance to the displayed image. Furthermore, it is considered especially appropriate to address the elements to display 'green' in the opposite direction to that used to display 'red' and 'blue' because of the greater contribution of green, in comparison to the colours red and blue, in the displayed image.

It can be seen from the above that the present invention provides a display with greatly enhanced brightness when compared to known displays of this type as the lamps can remain energised and display their respective colour characteristic for much longer periods; an improvement of approximately four-fold is achieved for the example described. The addressing of the elements 6 may be effected in any number of configurations, such as from side to side or up and down from the centre so long as the principle of the addressing method is followed. Namely, that of illuminating the display lamps during the writing of information and of re-ordering the writing for any given colour from frame to frame to compensate for the spatial intensity variation which would otherwise occur.

Although the present invention has been described with respect to specific embodiments, it should be realised that modifications may be effected whilst remaining within the scope of the invention. Hence, for example, light having a colour characteristic other than red, green or blue may be used. Also, the elements 6 may need not necessarily be liquid crystal display elements and the addressing can be effected in any combination of the configurations over a number of frames.

Furthermore, although in the embodiments described addressing of the pixels in the opposing directions occurs in successive frame periods, it is to be understood that such addressing in opposing directions may equally occur in frame periods which are not in immediate succession. Hence, for example, the addressing of the pixels in the first sequence direction to produce the light outputs of any or all of the respective colour characteristics may occur in the same sequence direction during two or three successive frame periods and then in the opposite sequence direction for two or three successive frame periods. In such circumstances, it is also envisaged that the addressing of the pixels may occur at an increased address rate such that each frame period is a sub multiple of the television frame rate.

I claim:

1. A method of operating a display device having a lattice of selectably settable pixel elements, the method comprising time multiplex addressing pixel elements of the display during each of a plurality of time intervals within a display period and, contemporaneously therewith illuminating the lattice to produce within a display period a plurality of light outputs each having a respective colour characteristic and a respective time interval within the display period, the time multiplexed addressing of pixel elements arranged to produce a light output of at least one respective colour characteristic during any display period, which output is arranged in a first sequence direction, and the time multiplexed addressing is arranged to produce a light output of the said at least one respective colour characteristic during a display period following the said any display period and being arranged in a second sequence direction opposite to the first sequence direction.

2. A method according to claim 1 wherein the display period following the said any display period in which the time multiplexed addressing of the pixels occurs in the first sequence direction comprises an immediately succeeding display period.

3. A method according to claim 1 wherein the light outputs of a respective colour characteristic comprise red, green and blue light outputs, and the pixels are time multiplexed in one of the sequence directions to provide the red and blue light outputs and in the opposite directions to provide the green light output.

4. A method according to claim 2 wherein the light outputs of a respective colour characteristic comprised red, green and blue light outputs, and the pixels are time multiplexed in one of the sequence directions to provide red and blue light outputs and in the opposite direction to provide the green light output.

5. A method according to claim 1 wherein the lattice comprises a plurality of rows and columns of pixel elements, the first sequence direction comprising addressing the elements from top towards bottom, and the second sequence direction comprising addressing the elements from bottom towards top.

6. A method according to claim 4 wherein the lattice comprises a plurality of rows and columns of pixel elements, the first sequence direction comprising addressing the elements from top towards bottom, and the second sequence direction comprising addressing the elements from bottom towards top.

7. A method according to claim 1 wherein the lattice comprises a plurality of rows and columns of pixel elements, the first sequence direction comprising addressing the elements from a first side thereof towards the opposite side thereof, the second sequence direction comprising addressing the elements from the opposite side thereof towards the first side thereof.

8. A method according to claim 4 wherein the lattice comprises a plurality of rows and columns of pixel elements, the first sequence direction comprising addressing the elements from a first side thereof towards the opposite side thereof, and the second sequence direction comprising addressing the elements from the opposite side thereof towards the first side thereof.

9. A method according to claim 1 wherein the lattice comprises a plurality of rows and columns of pixel elements, the first sequence direction comprising addressing the elements from a central region of the display towards one side thereof, and the second sequence direction comprising addressing the elements from one side thereof towards a central region.

10. A method according to claim 4 wherein the lattice comprises a plurality of rows and columns of pixel elements, the first sequence direction comprising addressing the elements from a central region of the display towards one side thereof, and the second sequence direction comprising addressing the elements from one side thereof towards a central region.

11. A method according to claim 3 wherein the respective time intervals each comprise substantially one third of a display period.

12. A method according to claim 4 wherein the respective time intervals each comprise substantially one third of a display period.

13. A method according to claim 1 further providing for blanking of the lattice during each time interval of a display period thereby to provide no light output from the display during the blanking.

14. A display device comprising: a lattice of selectably settable pixel elements; addressing means for time multiplex addressing pixel elements during each of a plurality of time intervals within a display period for the display; and illumination means for illuminating the lattice contemporaneously with the time multiplexed addressing thereof, for providing within a display period a plurality of light outputs each having a respective colour characteristic and a respective time interval within the display period, the addressing means being arranged to time multiplex address pixel elements in a first sequence direction in any one display period to produce a light output of at least one respective colour characteristic, and in a display period following the said any one display period, to time multiplex address pixel elements in a second sequence direction to produce a light output of the said at lease one respective colour characteristic, the second sequence direction being opposite to the first sequence direction.

15. A device according to claim 14 wherein the addressing means is arranged to address the pixels to provide each of the plurality of light outputs in a display period in the same sequence direction.

16. A device according to claim 14 wherein the light outputs comprise red, green and blue light outputs and the addressing means is arranged to time multiplex pixels to provide the red and blue light outputs in one of the sequence directions and the green light output in the opposite sequence direction.

17. A device according to claim 15 wherein the light outputs comprise red, green and blue light outputs and the addressing means is arranged to time multiplex pixels to provide the red and blue light outputs in one of the sequence directions and the green light output in the opposite sequence direction.

18. A device according to claim 14 further comprising blanking means for blanking the lattice during each time interval of a display period thereby to provide no light output from the display during blanking.

* * * * *